(12) United States Patent
Zuranski et al.

(10) Patent No.: US 6,430,219 B1
(45) Date of Patent: Aug. 6, 2002

(54) METHOD OF AND APPARATUS FOR PERFORMING LINE CHARACTERIZATION IN A SUBSCRIBER LINE COMMUNICATION SYSTEM

(75) Inventors: Edward S. Zuranski, Largo; Kenneth D. Ko, Clearwater; Jamal Haque, Tampa; Shrenik P. Patravali; Manuel I. Rodriguez, both of St. Petersburg; Keith A. Souders, Tampa; Anthony A. Tzouris, Clearwater, all of FL (US)

(73) Assignee: Conexant Systems, Inc., Newport Beach, CA (US)

( * ) Notice: Subject to any disclaimer, the term of this patent is extended or adjusted under 35 U.S.C. 154(b) by 19 days.

(21) Appl. No.: 09/028,023

(22) Filed: Feb. 23, 1998

Related U.S. Application Data

(63) Continuation-in-part of application No. 08/943,484, filed on Oct. 3, 1997, now Pat. No. 6,101,216.

(51) Int. Cl.[7] .............................. H03H 7/30; H04B 1/38
(52) U.S. Cl. ....................................... 375/231; 375/222
(58) Field of Search ................................. 375/229, 230, 375/231, 224, 225, 226, 227, 222, 377; 379/1, 6, 28, 93.01, 27

(56) References Cited

U.S. PATENT DOCUMENTS

| | | | |
|---|---|---|---|
| 3,988,677 A | | 10/1976 | Fletcher et al. |
| 4,020,461 A | | 4/1977 | Adams et al. |
| 4,333,175 A | | 6/1982 | Cook et al. |
| 4,574,167 A | | 3/1986 | Olek ........................ 379/27.01 |
| 4,689,783 A | | 8/1987 | Kaczerowski |
| 4,700,340 A | | 10/1987 | Beranek et al. |
| 4,761,779 A | | 8/1988 | Nara et al. |
| 4,766,594 A | | 8/1988 | Ogawa et al. |
| 4,792,940 A | * | 12/1988 | Hiraguchi ................... 375/222 |
| 4,799,217 A | | 1/1989 | Fang |
| 4,961,186 A | | 10/1990 | Chandramouli et al. |
| 5,001,729 A | * | 3/1991 | Tjahjadi et al. ............. 375/231 |
| 5,048,054 A | * | 9/1991 | Eyuboglu et al. ........... 375/222 |
| 5,050,205 A | | 9/1991 | Kelly et al. .................... 379/2 |
| 5,132,991 A | | 7/1992 | McNesby et al. |
| 5,144,625 A | | 9/1992 | Cain et al. |
| 5,243,593 A | | 9/1993 | Timbs |
| 5,259,000 A | * | 11/1993 | Kojima et al. ............... 375/222 |
| 5,268,929 A | * | 12/1993 | Hashimoto et al. .......... 375/222 |
| 5,297,145 A | | 3/1994 | Havermans |
| 5,297,186 A | * | 3/1994 | Dong .......................... 375/222 |
| 5,367,540 A | | 11/1994 | Kakuishi et al. |
| 5,392,334 A | | 2/1995 | O'Mahony .................. 379/67.1 |
| 5,400,394 A | * | 3/1995 | Raman et al. ............... 379/410 |
| 5,408,260 A | | 4/1995 | Arnon |
| 5,410,343 A | | 4/1995 | Coddington et al. |
| 5,440,612 A | | 8/1995 | Siligoni et al. ........... 379/27.01 |

(List continued on next page.)

OTHER PUBLICATIONS

Patent application for "Digital Subscriber Line Modem Utilizing Echo Cancellation to Reduce Near–End Cross–Talk Noise", filed Feb. 23, 1998, inventors: Zuranski, et al., Serial No. not yet assigned.

(List continued on next page.)

Primary Examiner—Tesealdet Bocure
(74) Attorney, Agent, or Firm—Foley & Lardner

(57) ABSTRACT

A digital subscriber line communication system does not require the use of a plain old telephone service (POTS) splitter in the resident's home. Digital signal processing techniques are utilized to adapt to varying subscriber line conditions due to POTS telephone equipment. The digital signal processing techniques eliminate the need for a splitter by reducing susceptibility to distortion due to varying subscriber line characteristics. The digital subscriber line modem characterizes the subscriber line under a variety of conditions. The digital subscriber line modem includes a control circuit which performs rapid retrain operation utilizing line characterization information.

19 Claims, 7 Drawing Sheets

U.S. PATENT DOCUMENTS

| | | | |
|---|---|---|---|
| 5,442,693 A | 8/1995 | Hays et al. | |
| 5,450,468 A | 9/1995 | Bushnell | 379/22.07 |
| 5,461,616 A | 10/1995 | Suzuki | |
| 5,479,447 A | 12/1995 | Chow et al. | |
| 5,519,731 A | 5/1996 | Cioffi | |
| 5,528,281 A | 6/1996 | Grady et al. | |
| 5,534,912 A | 7/1996 | Kostreski | |
| 5,553,059 A | 9/1996 | Emerson et al. | 370/248 |
| 5,559,792 A | 9/1996 | Bottoms et al. | 370/276 |
| 5,559,858 A | 9/1996 | Beveridge | |
| 5,592,540 A | 1/1997 | Beveridge | |
| 5,596,604 A | 1/1997 | Cioffi et al. | |
| 5,617,466 A | 4/1997 | Walance | 379/28 |
| 5,625,404 A | 4/1997 | Grady et al. | 725/114 |
| 5,627,501 A | 5/1997 | Biran et al. | 333/17.1 |
| 5,648,989 A | 7/1997 | Ko | 375/296 |
| 5,682,419 A * | 10/1997 | Grube et al. | 379/60 |
| 5,751,796 A * | 5/1998 | Scott et al. | 375/222 |
| 5,757,680 A | 5/1998 | Boston et al. | 702/121 |
| 5,790,594 A * | 8/1998 | Peng | 370/516 |
| 5,805,669 A * | 9/1998 | Bingel et al. | 375/28 |
| 5,841,836 A * | 11/1998 | Dunn et al. | 379/29 |
| 5,910,970 A * | 6/1999 | Lu | 375/377 |
| 5,949,819 A * | 9/1999 | Bjarnason | 375/231 |
| 5,999,563 A * | 12/1999 | Polley et al. | 375/222 |
| 6,014,425 A | 1/2000 | Bingel et al. | 379/26.02 |
| 6,069,899 A * | 5/2000 | Foley | 379/93.08 |
| 6,088,129 A * | 7/2000 | Yoshida | 358/425 |
| 6,091,766 A * | 7/2000 | Yoshido | 375/222 |
| 6,101,216 A * | 8/2000 | Henderson et al. | 375/222 |
| 6,111,936 A * | 8/2000 | Bremer | 379/28 |
| 6,134,265 A * | 10/2000 | Long | 375/222 |
| 6,161,203 A * | 12/2000 | Zuranski et al. | 714/707 |
| 6,263,077 B1 * | 7/2001 | Zuranski et al. | 375/222 |

OTHER PUBLICATIONS

Patent application for "Method of and Apparatus for Performing Line Characterization in a Non–Idle Mode in a Subscriber Line Communication System", filed Feb. 23, 1998, inventors: Souders, et al., Serial No. not yet assigned.

Patent application for "Communication System Utilizing Reed–Solomon Code to Achieve Auto Frame Synchronization Acquisition", filed Feb. 23, 1998, inventors: Zuranski, et al., Serial No. not yet assigned.

* cited by examiner

METHOD OF AND APPARATUS FOR PERFORMING LINE CHARACTERIZATION IN A SUBSCRIBER LINE COMMUNICATION SYSTEM

CROSS REFERENCE TO RELATED PATENT APPLICATIONS

The present application is a continuation-in-part application of U.S. patent application Ser. No. 08/943,484, filed Oct. 3, 1997 Henderson et al., now issued as U.S. Pat. No. 6,101,216 on Aug. 8, 2000, and entitled, "Splitterless Digital Subscriber Line Communications System."

FIELD OF THE INVENTION

The present invention relates generally to communication systems. More particularly, the present invention relates to a communication systems utilizing a subscriber line.

BACKGROUND OF THE INVENTION

Explosive growth of the internet and the worldwide web is driving a need for increased communication data rates. In the corporate world, the need for high-speed access or data rates is met by dedicated high-speed links (perhaps T1/E1 frame relays or OC1 ATM systems) from the company to an internet access provider. Users in the company utilize a local area network (LAN) to gain access to an internet access router which is attached to the high-speed link. Unfortunately, home users of the internet do not often have a high-speed link and must rely on standard analog or plain old telephone service (POTS) line.

The need for high-speed access to the home is ever increasing due to the availability of information, data, programs, entertainment, and other computer applications on the worldwide web and the internet. For example, designers of web technology are constantly developing new ways to provide sensory experiences, including audio and video, to users of the web (web surfers). Higher-speed modems will be required so the home user can fully interact with incoming web and communication technologies.

Although designers of modems are continuously attempting to increase data rates, analog or POTS line modems are presently only able to reach data rates of up to 56 kilobits per second (Kbps). These conventional analog modems transmit and receive information on POTS subscriber lines through the public switched telephone network. The internet access provider is also coupled to the switched telephone network and transmits and receives information through it to the subscriber line.

Some home users have utilized ISDN equipment and subscriptions to obtain up to 128 Kbps access or data rates by the use of 2 B channels. ISDN equipment and subscriptions can be expensive and require a dedicated subscriber line. Heretofore, neither ISDN modems nor analog modems are capable of providing 256 Kbps or higher access between the home and the internet. Over one megabit per second (Mbps) data rates with analog modems or ISDN equipment do not seem feasible at this time.

A variety of communication technologies are competing to provide high-speed access to the home. For example, asymmetric digital subscriber lines (ADSL), cable modems, satellite broadcast, wireless LANs, and direct fiber connections to the home have all been suggested. Of these technologies, the asymmetric digital subscriber line can utilize the POTS subscriber line (the wire currently being utilized for POTS) between the home user (the residence) and the telephone company (the central office).

ADSL networks and protocols were developed in the early 1990's to allow telephone companies to provide video-on-demand service over the same wires which were being used to provide POTS. ADSL technologies include discrete multitone (DMT), carrierless amplitude and phase modulation (CAP), high-speed ADSL (HADSL), and other technologies. Although the video-on-demand market has been less than originally expected, telephone companies have recognized the potential application of ADSL technology for internet access and have begun limited offerings.

ADSL technology allows telephone companies to offer high-speed internet access and also allows telephone companies to remove internet traffic from the telephone switch network. Telephone companies cannot significantly profit from internet traffic in the telephone switch network due to regulatory considerations. In contrast, the telephone company can charge a separate access fee for ADSL services. The separate fee is not as restricted by regulatory considerations.

With reference to FIG. 1, a conventional Asymmetric Digital Subscriber Loop (ADSL) system 10 includes a copper twisted pair analog subscriber line 12, an ADSL modem 14, an ADSL modem 16, a band splitter 18, and a band splitter 20. Line 12 is a POTS local loop or wire connecting a central office 32 of the telephone company and a user's residence 22.

ADSL modem 14 is located in user's residence 22 and provides data to and from subscriber line 12. The data can be provided from line 12 through modem 14 to various equipment (not shown) coupled to modem 14. Equipment, such as, computers, network devices, servers, or other devices, can be attached to modem 14. Modem 14 communicates with a data network across line 12 via modem 16. Modem 16 receives and transmits signals to and from line 12. Modem 16 can be coupled to other networks (not shown), including the internet.

At least one analog telephone 26, located in residence 22, can be coupled to subscriber line 12 through splitter 20 for communications across line 12 with telephone switch network 28. Telephone 26 and telephone switch network 28 (e.g., public-switched telephone (PST) network) are conventional systems well-known in the art. Alternatively, other analog equipment, such as, facsimile machines, POTS modems, answering machines, and other telephonic equipment, can be coupled to line 12.

System 10 requires that band splitter 18 and band splitter 20 be utilized to separate higher frequency ADSL signals and lower frequency POTS signals. For example, when the user makes a call from residence 22 on telephone 26, lower frequency signals (under 4 kilohertz (kHz)) are provided through band splitter 20 to subscriber line 12 and through band splitter 18 to telephone switch network 28. Band splitter 18 prevents the lower frequency POTS signals from reaching ADSL modem 16. Similarly, band splitter 20 prevents any of the POTS signals from reaching modem 14.

ADSL modem 16 and ADSL modem 14 communicate higher frequency ADSL signals across subscriber line 12. The higher frequency ADSL signals are prevented from reaching telephone 26 and telephone switch network 28 by band splitters 20 and 18, respectively. Splitters 18 and 20 can be passive analog filters or other devices which separate lower frequency POTS signals (below 4 kHz) from higher frequency ADSL signals (above 50 kHz).

The separation of the POTS signals and ADSL signals by splitters 18 and 20 is necessary to preserve POTS voice and data traffic and ADSL data traffic. More particularly, splitters 18 and 20 can eliminate various effects associated with POTS equipment which may affect the transmission of ADSL signals on subscriber line 12. For example, the impedance of subscriber line 12 can vary greatly as at least one telephone 26 is placed on-hook or off-hook. Additionally, the changes in impedance of subscriber line 12 can change the ADSL channel characteristics associated with subscriber line 12. These changes in characteristics can be particularly destructive at the higher frequencies associated with ADSL signals (e.g., from 30 kHz to 1 megahertz (MHz) or more).

Additionally, splitters 18 and 20 isolate subscriber line wiring within residence 22. The impedance of such wiring is difficult to predict. Further still, the POTS equipment, such as, telephone 26, provides a source of noise and nonlinear distortion. Noise can be caused by POTS voice traffic (e.g., shouting, loud laughter, etc.) and by POTS protocol, such as, the ringing signal. The nonlinear distortion is due to the nonlinear devices included in conventional telephones. For example, transistor and diode circuits in telephone 26 can add nonlinear distortion and cause hard clipping of ADSL signals. Telephone 26 can further generate harmonics which can reach the frequency ranges associated with the ADSL signals. The nonlinear components can also demodulate ADSL signals to cause a hiss in the audio range which affects the POTS.

Conventional ADSL technology has several significant drawbacks. First, the costs associated with ADSL services can be quite large. Telephone companies incur costs related to central office equipment (ADSL modems and ADSL network equipment) and installation costs associated with the ADSL modems and network equipment. Residential users incur subscriber equipment costs (ADSL modems) and installation costs.

Installation costs are particularly expensive for the residential user because trained service personnel must travel to residence 22 to install band splitter 20 (FIG. 1). Although band splitter 18 must be installed at the central office, this cost is somewhat less because service personnel can install band splitter 18 within central office 32. Also, at office 32, splitter 18 can be included in ADSL modem 16. However, in residence 22, splitter 20 must be provided at the end of subscriber line 12.

Additionally, ADSL equipment for the residence, such as, modem 14, is expensive because the most complex component of modem 14 (e.g., the receiver) is located at residence 22 since high-speed transmissions are generally received within residence 22, and lower-speed transmissions are received by central office 32. In most internet applications, larger amounts of data are requested by the residential user rather than by the internet source. Receivers are typically much more complex than transmitters. These high-speed receivers often receive data at rates of over 6 Mbps.

ADSL equipment can be subject to cross-talk noise from other subscriber lines situated adjacent to subscriber line 12. For example, subscriber lines are often provided in a closely contained bundle. The close containment can cause cross-talk from other subscriber lines to be placed on subscriber line 12. Modem 14 must compensate for cross-talk noise.

Thus, there is a need for a digital subscriber line (DSL) communication system which does not require the use of a splitter in the residence. Further, there is a need for a communication system which can characterize conditions on a subscriber line so the modem can accommodate conditions on the subscriber line. Further still, there is a need for a DSL modem which can characterize POTS activity on the subscriber line.

SUMMARY OF THE INVENTION

The present invention relates to a method of characterizing a subscriber line in a communication system including a first modem and a second modem coupled via the subscriber line. The method includes providing a test signal under a plurality of conditions, receiving the test signal under the conditions, analyzing the test signal under each of the conditions to generate a characterization signal for each of the conditions, and storing the characterization signal with respect to each of the conditions. The test signals are provided from the first modem to the second modem and received with the second modem.

The present invention further relates to a digital subscriber loop modem which includes a data line access, an equalizer and a line characterization circuit. The data line access is coupled to a subscriber line. The equalizer is coupled to the data line access and has a response in accordance with equalizer control signals. The line characterization circuit is coupled with the equalizer and receives a test signal on the subscriber line. The line characterization circuit analyzes the test signal to generate the equalizer control signals. The line characterization circuit stores the equalizer control signals.

The present invention even further relates to a method of characterizing a subscriber line in a communication system including a first modem and a second modem coupled to the subscriber line. The method includes performing characterization tasks under a plurality of conditions on the subscriber line, measuring parameters associated with the characterization task to obtain a result for each of the conditions, and storing the result for each of the conditions. The result is related to characteristics of the subscriber line.

According to an exemplary aspect of the present invention, the communication system allows POTS signals and ADSL signals to be simultaneously transmitted on a subscriber line without the use of a splitter located in the user's residence. Digital signal processing techniques are utilized to adapt to the varying subscriber line characteristics due to the activity of POTS equipment coupled to the subscriber line. The digital signal processing techniques eliminate the need for the splitter by changing data transmission characteristics in accordance with the varying line characteristics. The varying subscriber line characteristics are measured by the communication system and stored.

In accordance with a further exemplary aspect of the present invention, the communication link has characteristics which vary within finite limits due to the physical nature of the subscriber line. A line characterization circuit determines the subscriber line characteristics under various conditions. The communication system adapts to the subscriber line characteristics to enhance the quality of data transfers.

In accordance with another exemplary aspect of the present invention, the DSL modem includes a line characterization circuit. The line characterization circuit determines subscriber line characteristics by analyzing received test signals. The test signals are communicated between modems when the modem is not transmitting data (e.g., in an idle mode). The modem can schedule a variety of characterization tasks in accordance with various controlled conditions to determine subscriber line characteristics during the various controlled conditions.

BRIEF DESCRIPTION OF THE DRAWINGS

The invention will be further described with reference to the accompanying drawings, wherein like numerals denote like elements, and.

DETAILED DESCRIPTION OF PREFERRED EXEMPLARY EMBODIMENTS

Figure 2:
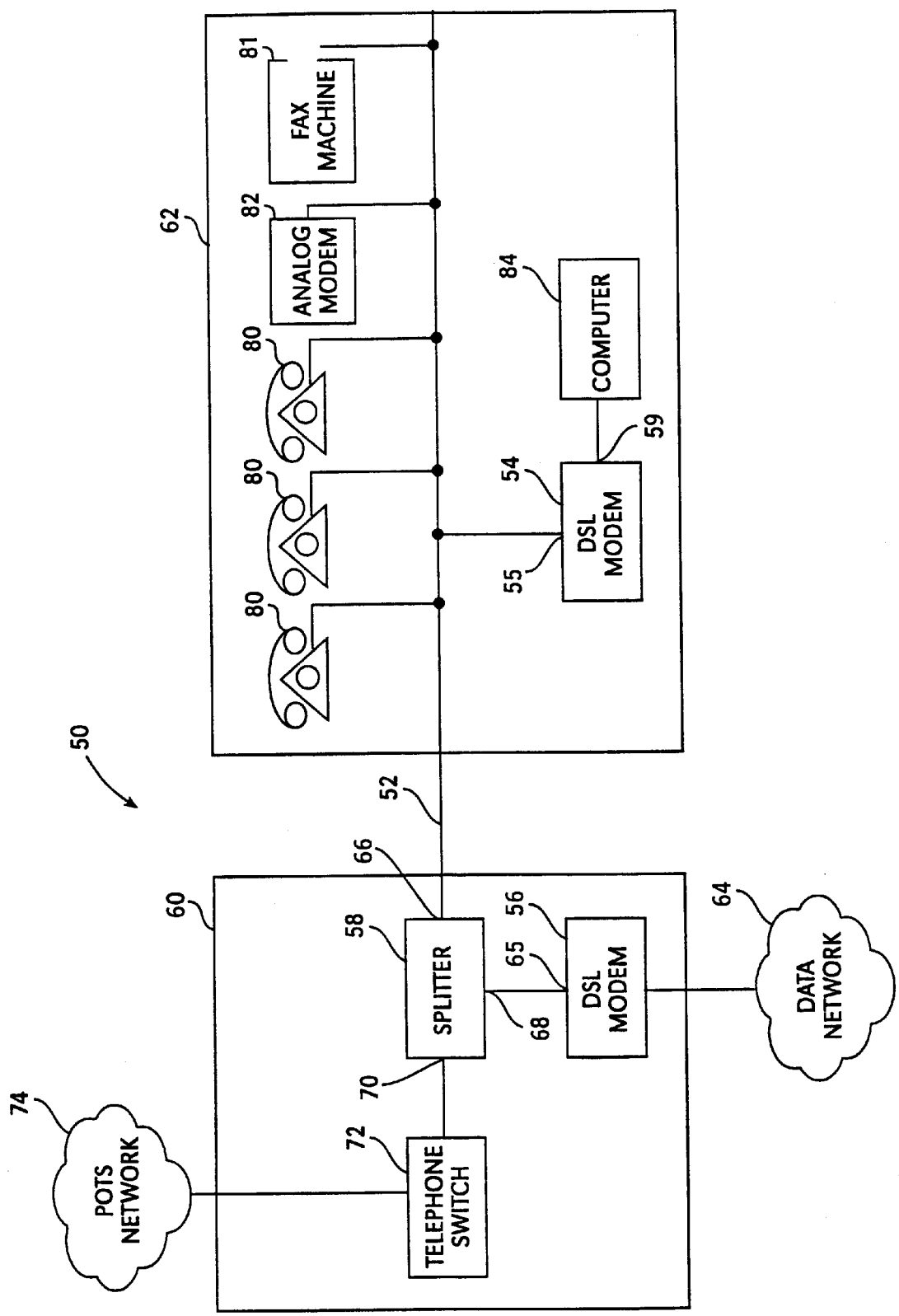
FIG. 2 is a schematic block diagram of a communication system in accordance with an exemplary embodiment of the present invention, the communication system includes a DSL modem in accordance with another exemplary embodiment of the present invention.

With reference to FIG. 2, a DSL communication system 50 includes a copper twisted pair subscriber line 52, a customer or residential DSL modem 54, a remote or central office DSL modem 56, and a band splitter 58. Subscriber line 52 is a local loop, such as, a twisted pair of American wire gauge (AWG) 24 or 26 copper wires, which connects a central office 60 and a residence 62. Residence 62 can also be an office, building, or other facility. Similarly, central office 60 can be any facility associated with a provider of telephone services.

DSL modem 56 is coupled to a data network 64. Splitter 58 has a signal input 66 coupled to subscriber line 52, a higher-frequency output 68 coupled to DSL modem 56, and a lower-frequency output 70 coupled to a telephone switch 72. Telephone switch 72 is coupled to a POTS network 74. DSL modem 56, splitter 58, and telephone switch 72 are preferably located in central office 60. Alternatively, splitter 58 could be included as part of DSL modem 56 (e.g., DSL modem 56 is provided as an in-line device between subscriber line 52 and switch 72).

In residence 62, one or more telephones 80, analog facsimile machine 81, and analog modem 82 can be coupled directly to subscriber line 52 as is well known in the art. Telephones 80 can be any conventional communication devices, including answering machines, which can be coupled to subscriber line 52 for providing various POTS functions.

DSL modem 54 is coupled directly to subscriber line 52 at a data terminal or access 55. DSL modem 54 is also coupled to a computer 84. Alternatively, DSL modem 54 could be coupled to other devices (not shown), such as, a network, server, or other communication or computing device.

Figure 1:
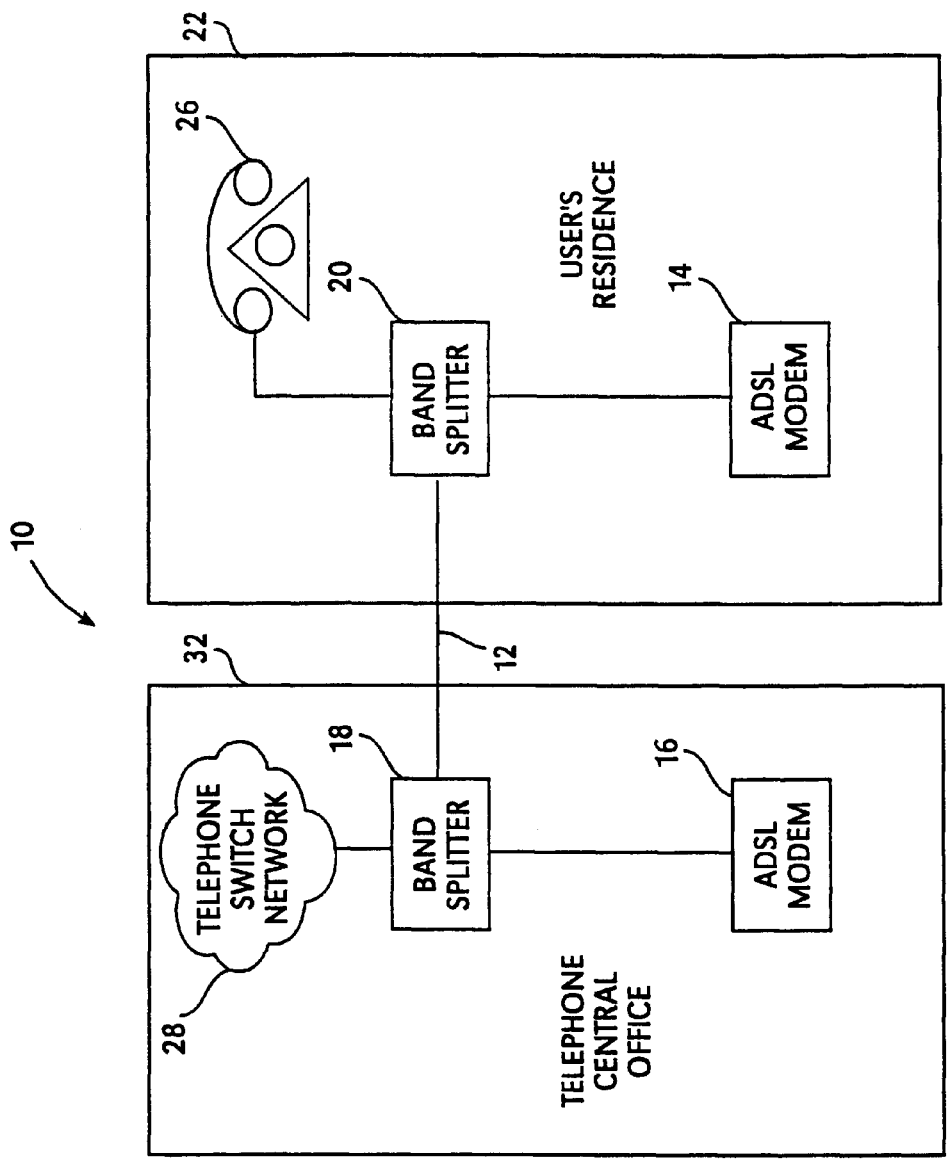
FIG. 1 is a schematic block diagram of a prior art ADSL communication system.

Unlike conventional ADSL communication systems, such as, system 10 described with reference to FIG. 1, DSL modem 54 does not utilize a splitter between modem 54 and subscriber line 52 and between telephones 80 and subscriber line 52. DSL modem 54 advantageously utilizes digital signal processing techniques to adapt to varying subscriber line characteristics due to analog equipment, such as, telephones 80, machine 81, and modem 82, thereby eliminating the need for a splitter in residence 62. DSL modem 54 can operate concurrently with any of telephones 80, machine 81, and analog modem 82.

DSL modem 54 preferably includes data access 55 which is part of a standard connector, such as, an RJ11 walljack, and is coupled to subscriber line 52 similarly to conventional telephones 80 and analog modems 82. Terminal 55 is preferably a two-wire terminal.

Figure 3:
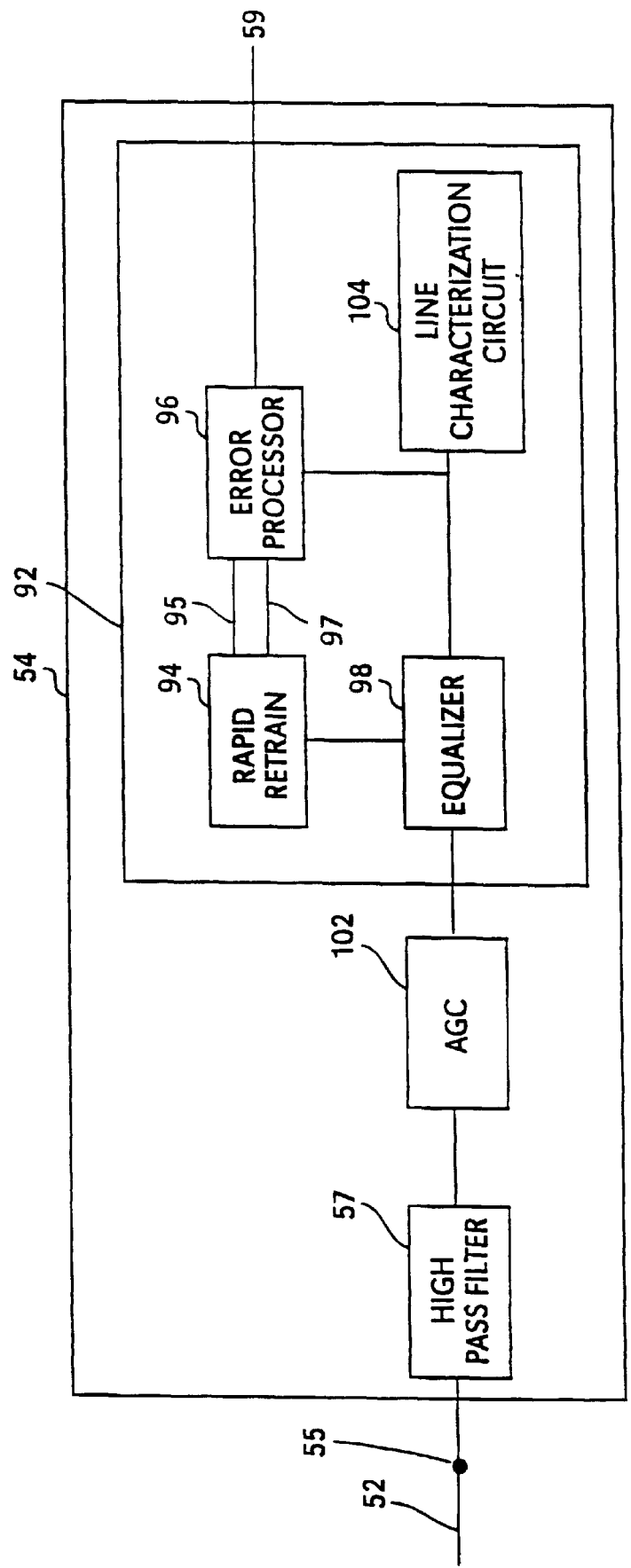
FIG. 3 is a more detailed schematic block diagram of the DSL modem illustrated in FIG. 2, the DSL modem includes a control circuit in accordance with yet another exemplary embodiment of the present invention.

Modem 54 can be provided as an internal device in computer 84, such as, on a PCI card, or as an external device. Preferably, modem 54 is an internal device so that high speed communications between modem 54 and computer 84 are not slowed by serial ports associated with computer 84. As an external device, modem 54 could be coupled through a printer port or a universal serial bus (USB) to computer 84. In FIG. 3, modem 54 is coupled to computer 84 via a data terminal 59.

Modem 54 is preferably implemented with a digital signal processing chip set. Other suitable processors can be utilized to run software modules to implement the operations described in the present application. The software modules implement most tasks associated with modem 54. The tasks include digital filtering, line characterization, modulation, demodulation, gain control, equalization, initialization error correction, test functions, and other modem requirements.

In operation, modem 54 adjusts operating characteristics, such as, equalization parameters, gain, and data rates, according to variables associated with line 52. Modem 54 is capable of receiving data at least at a one megabit per second (Mbps) data rate when line 52 is approximately 12 kilofeet and when all of telephones 80 are on-hook. Preferably, the reception (downstream) data rate is no worse than 256 Kbps data rate in the presence of POTS-related impairments associated with telephones 80. Modem 54 is capable of transmitting data at least at a 100 Kbps data rate when line 52 has a length of 12 kilofeet and when all telephones 80 are on-hook. The transmission (upstream) data rate is preferably no worse than 64 Kbps in the presence of POTS-related impairments. By utilizing lower data rates than maximum ADSL data rates, such as, 6 Mbps, modem 54 can be manufactured less expensively and is more able to withstand POTS-related impairments.

DSL modem 56 is similar to DSL modem 54. However, modem 56 preferably is a lower-power modem to minimize the power consumed by central office 60. Additionally, modem 56 can have a sleep mode so that when modem 56 is not being accessed, significant power is not consumed by modem 56. Modem 56 can have a lower-cost receiver unit (not shown) because upstream data rates are lower than downstream data rates, as discussed above. In the sleep mode, processors and other electronic devices in modem 56 are placed in a low-power or no-power mode by slowing or stopping clock signals within modem 56. If modem 54 is utilized within a laptop computer, lower-power techniques are desirable for modem 54 as well.

Modem 54 advantageously utilizes digital signal processing techniques to characterize and to classify interference sources going both to the POTS portion of the spectrum from the DSL portion of the spectrum and from the POTS portion of the spectrum to the DSL portion of the spectrum. Modem 54 compensates for these interference sources with digital signal processing techniques. For example, when telephone 80 is brought off-hook, an impedance change occurs on line 52. Modem 54 can adjust data rates, gain characteristics, and filter parameters to compensate for the impedance change. Thus, modem 54 can utilize digital signal processing techniques to compensate for interference from POTS equipment, such as, telephone 80. Preferably, the digital signal processing techniques can rapidly adjust to interference sources so communication latency are not noticeable to the user.

In operation, DSL modems 54 and 56 communicate signals as quadrature amplitude modulated (QAM) signals. Alternatively, the signals can be carrierless amplitude phase (CAP) modulated signals or discrete multi-tone signals. DSL modems 54 and 56 communicate data at various constellation sizes, ranging from 4 to 256 points. The data can be transmitted in Reed-Solomon frames, where the R-S code rate is 0.941176471 (K/N) and N=68 and K=64. Alternatively, other values for N and K can be utilized to optimize data and frame rates.

DSL modem 54 transmits upstream signals in a lower-frequency range and receives downstream signals in a higher-frequency range, in accordance with frequency division multiplexing techniques. For example, modem 54 preferably transmits upstream signals at a carrier frequency between a lower band edge of 46 kHz and an upper band edge of 114 kHz. Modem 54 transmits upstream signals at a line rate (e.g., bandwidth or data rate) of 136 Kbps for a constellation sizes of 4 points and at a data rate of 340 Kbps for a constellation size of 32 points. Modem 56 receives the upstream signals at the same rates. Data rates are across channel before error coding bits (Trellis and Reed-Solomon) are removed.

DSL modem 56 transmits downstream signals at a carrier frequency between a lower band edge of 265.5 kHz and an upper band edge of 605.5 kHz. DSL modem 56 transmits downstream signals at data rate of 680 Kbps for a constellation size of 4 points and at a data rate of 1.7 Mbps for a constellation rate of 32 points. Modem 54 receives the downstream signals at the same rates. Alternatively, other carrier frequencies can be utilized, such as, 342 kHz, 367.5 kHz, or 418.5 kHz for transmitting downstream information. The use of frequency division multiplexing eliminates the need for an echo canceler (not shown) and eliminates nonlinear effects of echo canceling.

Modems 54 and 56 can utilize a variety of protocols to transmit and receive upstream and downstream signals. Modems 54 and 56 could additionally utilize a auxiliary channel within a control frequency band for transmitting control information between modems 54 and 56. Modems 54 and 56 can also utilize various error protocol, such as, Read-Solomon coding, multidimensional Trellis coding, or other protocols, to gain higher immunity to noise and other phone line impairments. Trellis coding is a method of forward error correction where each signal element is assigned a coded binary value representing the element's phase and amplitude. The coding allows the receiving modem to determine, based on the value of the receiving signal, whether or not a given signal element is received in error.

With reference to FIG. 3, modem 54 includes a high-pass filter 57 coupled between data terminal 55 which is coupled to subscriber line 52 and a control circuit 92. High-pass filter 57 preferably has a threshold frequency above 4 kHz and beneath the lowest band carrier edge for the DSL signals (e.g., 46 kHz) to prevent POTS signal from entering modem 54. Control circuit 92 includes a rapid retrain module or circuit 94, an error processor 96, a line characterization module or circuit 104, and an equalizer 98. Additionally, an automatic gain control circuit (AGC) 102 is disposed between high-pass filter 57 and equalizer 98.

Circuit 102 can be an analog circuit. Alternatively, circuit 102 can be a digital circuit located in control circuit 92 or a hybrid analog and digital circuit. Filter 57 can be a passive filter with a threshold frequency of 10 kHz.

Equalizer 98 is a digital filter through which signals are transmitted and received to and from line 52. Equalizer 98 can be on a receive side of control circuit 92, a transmit side of control circuit 92, or both. Equalizer 98 is an adaptive compensation circuit for counteracting distortions on line 52.

Equalizer 98 is preferably a decision feedback equalizer defined by tap coefficients. Equalizer 98 is implemented by a digital signal processor (not shown) running a software program. In the receive mode, equalizer 98 provides filtered signals to error processor 96 as well as other portions of control circuit 92. The filtered signals are processed by circuit 92 and provided at data 59. In the transmit mode, equalizer 98 filters or pre-emphasizes signals provided by circuit 92 to line 52.

Equalizer 98 must be converged (e.g., tuned) so the constellation associated with QAM signals are appropriately situated for decoding. Alternatively, equalizer 98 can be any device, digital or analog, for reducing frequency or phase distortion, or both, on subscriber line 52 by the introduction of filtering to compensate for the difference in attenuation or time delay, or both, at various frequencies in the transmission and reception spectrums.

Rapid retrain circuit 94 provides control signals (e.g., tap coefficients) to equalizer 98 to converge equalizer 98, thereby compensating for distortion on line 52. Rapid retrain circuit 94 causes equalizer 98 to converge in response to a raise rate rapid retrain signal provided by error processor 96 on a line 97. Rapid retrain circuit 94 also causes equalizer 98 to converge in response to a lower rate rapid retrain signal provided by error processor on a line 95. Rapid retrain circuit 94 can utilize tap coefficients developed by line characterization circuit 104. As discussed in more detail below, circuit 104 can store a number of coefficients for known error conditions in a flash memory or other storage device. Alternately, the coefficients can be interactively determined, as discussed below.

Error processor 96 monitors signals from equalizer 98 to determine if significant errors in the communication of data on line 52 are occurring. If significant errors are occurring, a lower rate rapid retrain signal is provided on line 95 so rapid retrain circuit 94 retrains modem 54. If few errors are occurring, and data is communicated at a lower data rate, a raise rate retrain signal is provided on line 97 so circuit 94 retrains modem 54 so data is communicated at a higher rate.

As part of the retrain operation, modem 54 performs a variety of tasks to ensure accurate data communication. A retrain operation for modem 54 can include the following tasks: reacquiring timing from a remote modem, such as, modem 56, converging equalizer 98, and adjusting the data rate. Additionally, the retrain operation can also include characterizing line 52 and adjusting the automatic gain control circuit 102. Depending on modem 54 and line 52 parameters, circuit 94 can perform different levels of retrain operations.

In a slow retrain or initialization operation, a retrain operation from initiation variables (e.g., scratch) of modem 54 can include reacquiring timing, characterizing line 52, adjusting circuit 102 from initialization variables, converging equalizer 98 from initialization variables, and determining a data rate. Characterizing line 52 can involve performing line characterization routines by circuit 104, as discussed below. Since adjustments to circuit 102 and converging equalizer 98 is an interactive process, these procedures can be time-consuming. The slow retrain can take as long 6.5 seconds. Nonetheless, time is saved, even in the slow retrain operation when compared to conventional modems, because modem 54 advantageously does not utilize an echo canceler (not shown). The echo canceler typically must be reset during a retrain operation.

To save time, a rapid-retrain operation can eliminate one or more of the above steps or perform the above steps from predicted variables (variables which are initially closer to the desired value than initialization variables). In a rapid retrain operation, the line characterization step is eliminated, and circuit 102 and 98 are adjusted slightly or converged from a stored coefficient. For example, according to a rapid retrain operation, the center tap coefficient for equalizer 98 can be determined, and the remaining coefficients can be adjusted based on the difference between the determined center tap coefficient and the previous center tap coefficient.

According to another rapid retrain operation, prestored tap coefficients are utilized so equalizer 98 does not have to be significantly converged. The tap coefficients are chosen based upon conditions recognized by circuit 94, such as, telephone 80 (FIG. 2) being brought off-hook. The adjustment of the gain circuit 102 can be restricted to a range to save time.

System and application parameters associated with modem 54 and line 52 can define the amount of time required for a rapid retrain of modem 54. For example, a rapid retrain may occur in a particular amount of real time, such as, less than 0.5 seconds. A rapid retrain within 0.5 seconds assures that the transmission of data is not affected for perceivable delays as modem 54 is retrained. A 0.5 second retrain operation is a vast improvement over the conventional 6.5 seconds for initialization retrain operations. Alternatively, the rapid retrain operation may occur in a much shorter time period, particularly if error processor 96 and rapid retrain circuit 94 are able to determine what changes on subscriber line 52 have caused errors. Circuit 94 can react to those changes and access a database or other data indicative of coefficients for equalizer 98, gain parameters for circuit 102, data rates, or other criteria for appropriate communication of data on line 52. For example, such a database could be stored on computer 84 coupled to modem 54 (FIG. 2). Further still, a very rapid retrain operation could occur where equalizer 98 does not have to be converged, and only the gain of circuit 102 needs to be adjusted. Thus, rapid retrain circuit 94 is capable of retraining modem 54 in a rapid manner in response to error processor 96, discovering that there are errors in the communication of data on subscriber line 52.

When rapid retrain circuit 94 performs a retrain operation, data rates associated with modem 54 are adjusted to maximize the data rate, while maintaining the integrity of the communications. For instance, if error processor 96 determines that a particular number of errors are occurring, rapid retrain circuit 94 may adjust the data rate down, thereby reducing the size of the constellation. Error processor 96 can determine errors which require an adjustment of equalizer 98, such as, tangential error, radial error, or other errors. Error processor 96 can also react to trellis-coding errors, Reed-Solomon errors, square error levels, or other errors. Alternatively, if error processor 96 determines that the mean squared error level is below a threshold, rapid retrain circuit 94 can retrain modem 54 and adjust the data rate upward by increasing the size of the constellation. The threshold used to compare the mean square error, as well as other errors, is variable according to user parameters and the data rate.

Line characterization circuit 104 can perform a variety of operations to characterize line 52 for the development of tap coefficients for equalizer 98 and of other parameters for modem 54. Line characterization tests can be performed when modem 54 is at initialization, in an idle mode, or in a non-idle mode. According to one line characterization test, tones or test patterns are transmitted across line 52 in accordance with a test protocol. Modems 54 and 56 cooperate to determine characteristics of line 52 based upon received tones or test patterns. In a non-idle mode, the test pattern can be sent and analyzed during the time the user is awaiting communications from the Internet. Further, a separate control channel can be utilized to send control information necessary to characterize line 52. The operation of circuit 104 is discussed in more detail below with reference to FIGS. 6 and 7.

In another embodiment, circuit 104 can enter a learn mode and analyze line 52 under a variety of conditions. While in the learn mode, the user can bring telephone 80 (FIG. 2) off-hook in response to instructions generated by software on computer 84. Modem 54 can characterize line 52 during those particular conditions. Coefficients for equalizer 98 can be generated for those conditions and stored for a rapid retrain operation. Further still, circuit 104 can perform line-probing operations similar to the V.34 standard.

In yet another embodiment, an echo canceler (not shown) can be utilized on a transmit side of modem 54 to remove the transmitted signals in the transmit frequency spectrum. Control circuit 92 can analyze the characteristics in the transmit frequency spectrum of line 52. This analysis can be performed during non-idle modes. The portion of equalizer 98 on the transmit side can be adjusted according to the analysis to predistort or to preemphasize the transmitted signals. Digital frequency processing techniques can also include various error signal analysis, correction, and manipulation to determine when a rapid retrain is necessary as well as techniques for rapidly converging an equalizer associated with modem 54.

Figure 4:
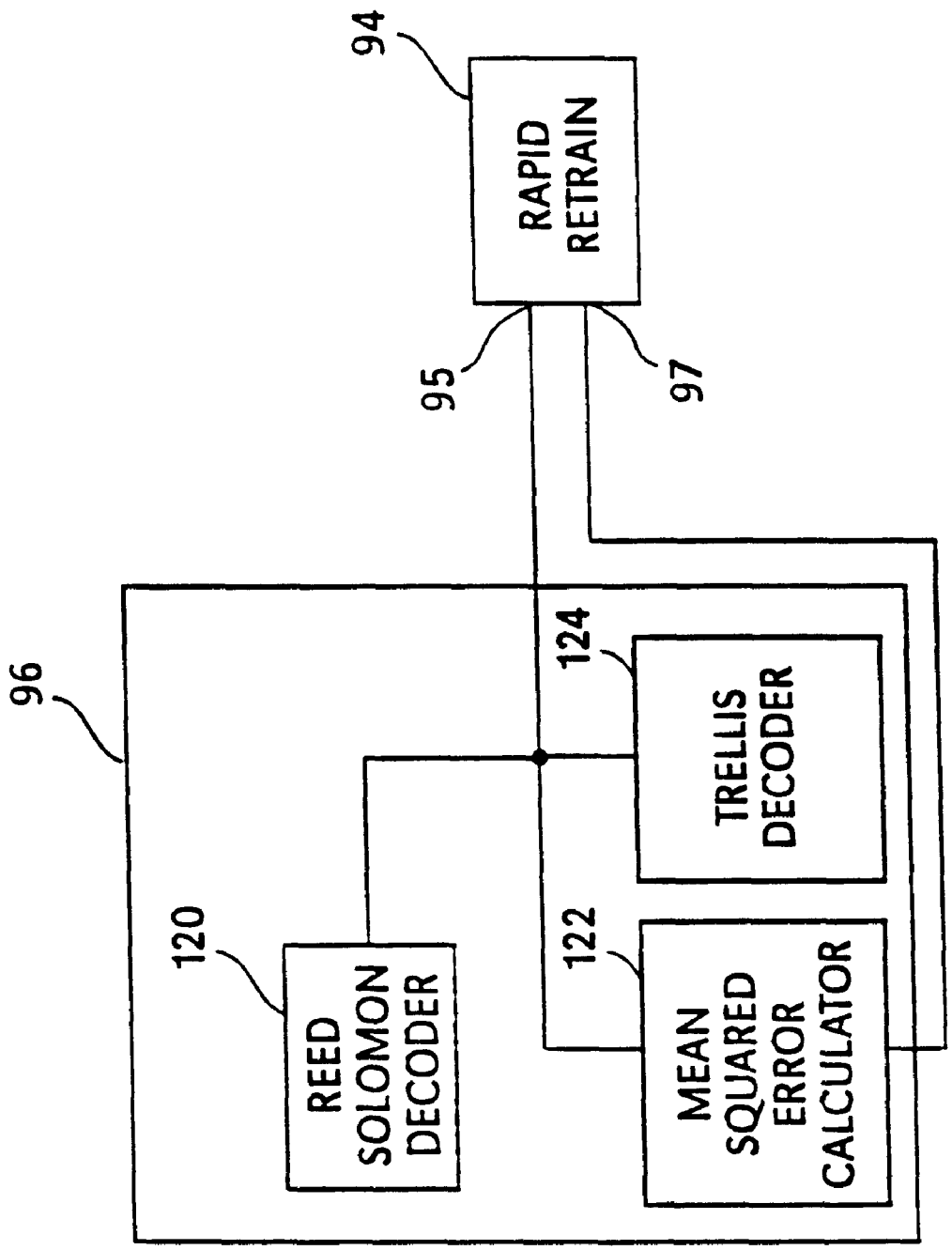
FIG. 4 is a more detailed schematic block diagram of the control circuit illustrated in FIG. 3.

With reference to FIG. 4, error processor 96 includes a Reed-Solomon decoder 120, a mean squared error calculator 122, and a Trellis error decoder 124. Processor 96 can also include a viterbi error circuit (not shown). Reed-Solomon decoder 120 analyzes frames of data provided from error decoder 124 and determines if a frame error occurs and if errors are occurring in the frame. Reed-Solomon decoder 120 can correct errors as is well known in the art.

Reed-Solomon decoder 120, calculator 122, and Trellis decoder 124 provide a lower rapid retrain signal when error conditions indicate that the data rate should be lowered. Rapid retrain circuit 94 performs a rapid retrain operation and lowers the data rate in response to the lower rate rapid retrain signal at input 95. In contrast, when the mean squared error calculator 122 provides a raise rate rapid retrain signal at input 97, rapid retrain circuit 94 raises the data rate and performs a rapid retrain. Thus, modem 54 automatically raises or lowers its data rate to maintain high-speed and accurate communications in the presence of POTS-related impairments.

Although the data rates associated with modems 54 and 56 are somewhat lower than maximum data rates associated with conventional ADSL systems, these data rates are still significantly higher than conventional analog modem capabilities. The lower data rates allow modems 54 and 56 to use smaller constellation sizes and frequency division multiplexing, as well as withstand POTS-related impairments.

Digital signal processing techniques can include rapid retrain operations where the modem is adjusted to changing subscriber line techniques due to POTS operations. Such adjustments can include adjusting automatic gain control circuit 102, converging equalizer 98, and error processing. Further, digital signal processing techniques can include line characterization techniques performed by circuit 104 (FIG. 3).

Figure 5:
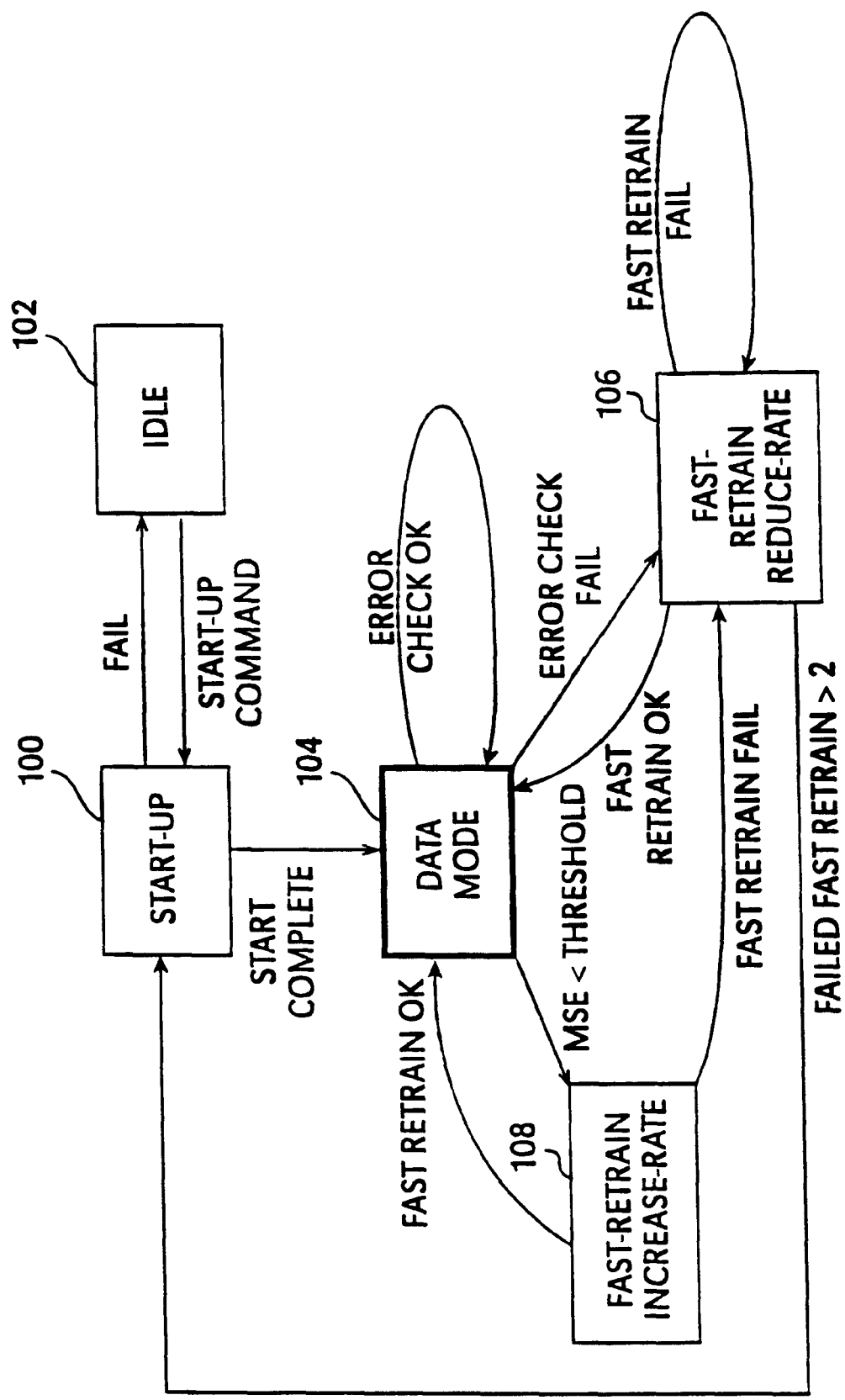
FIG. 5 is a state diagram showing an example of the operation of the DSL modem illustrated in FIG. 3.

With reference to FIG. 5, operation of modem 54 is described with reference to FIGS. 2–5. FIG. 5 is a state diagram showing rapid retrain operations for modem 54. Modem 54 preferably always provides the highest data rate available on line 52, according to a rate-adaptive digital subscriber line (RADSL) technique. Modem 56 should have the ability to set a maximum downstream data rate so that the telephone company can limit the maximum downstream data rate to avoid advantaging subscribers who live close to office 60. According to the RADSL technique, modems 54 and 56 constantly adjust the data rates to reach maximum data rate potential on subscriber line 52 (FIG. 2).

In FIG. 5, modem 54 (FIG. 2) is capable of a start-up state 100, an idle state 102, a data mode state 104, a fast retrain reduce rate state 106, and a fast retrain increase rate state 108. When off or idle, modem 54 transfers from idle state 102 to start-up state 100 when it receives a start-up command.

In start-up state 100, modem 54 is initialized. During initialization, timing is acquired from a remote modem, such as, modem 56, automatic gain circuit 102 is adjusted, equalizer 98 is converged, the carrier phase is locked, line 52 is characterized, and a data rate is selected. If start-up is successfully completed, modem 54 advances to data mode state 104, where data is communicated across subscriber line 52.

As data is communicated at the data rate selected during start-up state 100, error signals from error processor 92 are consistently checked. If the error signals are within an acceptable level, modem 54 is maintained in data mode state 104. However, if the error signals are above a particular level, modem 54 enters fast retrain reduce rate state 106. In state 106, modem 54 reduces the data rate, adjusts automatic control circuit 102, re-acquires timing, and converges equalizer 98. Preferably, equalizer 98 is retrained from stored coefficient values to reduce the amount of time required for retraining. Alternatively, another mode (not shown) may be entered where just the automatic gain control 102 (FIG. 3) is adjusted, and the data rate is not changed to compensate for errors.

In state 106, if the fast retrain fails, another fast retrain is attempted. If more than two fast retrain attempts fail, modem 54 returns to start-up state 104. As at initialization, if start-up fails, modem 54 enters idle state 102.

If the fast retrain operation is successfully completed, modem 54 returns to data mode state 104 and continues to communicate data at a lower data rate. The data rate can be adjusted incrementally or by other relationships. For example, if the errors are due to known POTS activity, particular data rates may be known to operate during that activity, and those data rates may be chosen.

In state 104, if the mean squared error signal provided by mean squared error calculator 122 is below a threshold, modem 54 enters fast retrain increase rate state 108. Modem 54 is retrained in state 108 similarly to state 106, except that the data rate is increased. If the fast-retrain operation is completed successfully, modem 54 changes from state 108 to state 104 and continues normal data communication operations at the faster rate. If the fast retrain operation fails in state 108, modem 54 enters state 106 and performs a fast retrain reduce rate operation.

Figure 6:
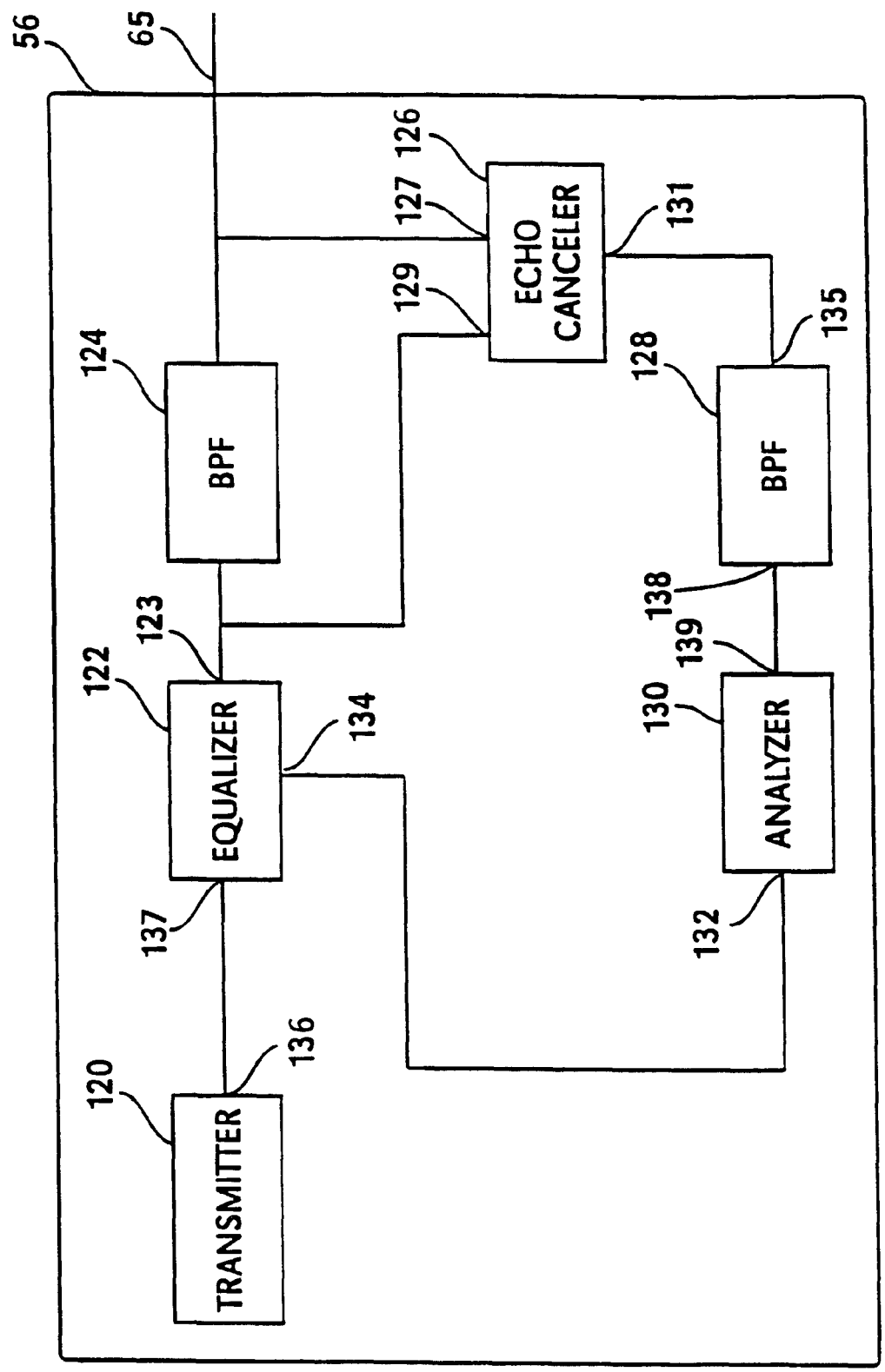
FIG. 6 is a flow chart showing a line characterization task.

With reference to FIGS. 3 and 6, a line characterization task 150 can be performed by line characterization circuit 104 when modems 54 and 56 are not transmitting data. A non-data transmitting state can exist in a variety of circumstances, such as when modem 54 is active and waiting for data or information from the internet or other data source, when modem 54 is initialized or started-up, when modem 54 is in a test mode, or when modem 54 is otherwise idle.

When modem 54 is not communicating data, modem 54 advances to a step 152 and signals modem 56 to send a test signal. At a step 152, modem 54 receives the test signal for modem 56. Modem 54 can signal modem 56 to send the test signal over a data channel, or over a separate control channel.

The test signal can be any of a variety of manifestations intended to reveal characteristics of subscriber line 52. For example, the test signal can be a number of predetermined tones spaced apart from each other at known frequencies. The tones can be provided at known power levels and equally spaced frequencies. One test signal can include a tone at every 150 Hz between 240 KHz and 1.1 MHz. Other frequency intervals and ranges can be utilized. Alternatively, subsets of frequency ranges, overlapping frequency ranges, and other test signals can be utilized. In another alternative, the test signal can include white noise transmitted from modem 56 to modem 54, or the test signal can be a chirp signal which has a frequency which varies (e.g., from low to high) over a predetermined time period.

After the test signal is received, the test signal is analyzed to determine characteristics of line 52 at a step 156. At a step 158, modem 54 preferably stores the characteristics of line 52. The characteristics of line 52 can be represented by equalizer control signals (e.g., tap coefficients). The equalizer control signals can be stored for use in rapid retrain operation such as rapid retrain operation 100 discussed with reference to FIG. 5. The equalizer control signals can be determined in step 156 and stored in step 158.

In step 156, circuit 104 can analyze the receive test signals and determine at which frequency levels impairments are present on line 52. For example, if the test signal includes a number of spaced apart tones, circuit 104 determines the attenuation on line 58 at the various frequencies associated with the tones. From this analysis, line characterization circuit 104 can generate equalizer control signals for equalizer 98 (e.g., tap coefficients) which allow modem 54 to adapt to characteristics of line 52.

In another example, if the test signal includes white noise, circuit 104 can perform a fast fourier transform (FFT) on the white noise to determine the frequency response characteristics of subscriber line 52 at step 156. If the test signal is a chirp signal, circuit 104 can analyze the received chirp signal over the frequency range to determine the characteristics of line 52 at step 156.

Line characterization task 100 can be performed under a variety of conditions to determine the characteristics of line 52 under a variety of circumstances as explained below with reference to FIG. 7. Modem 54 is preferably configured to exit task 150 if data communication on line 52 begins. Alternatively, modem 54 can be configured to delay data communication until task 150 is completed.

Figure 7:
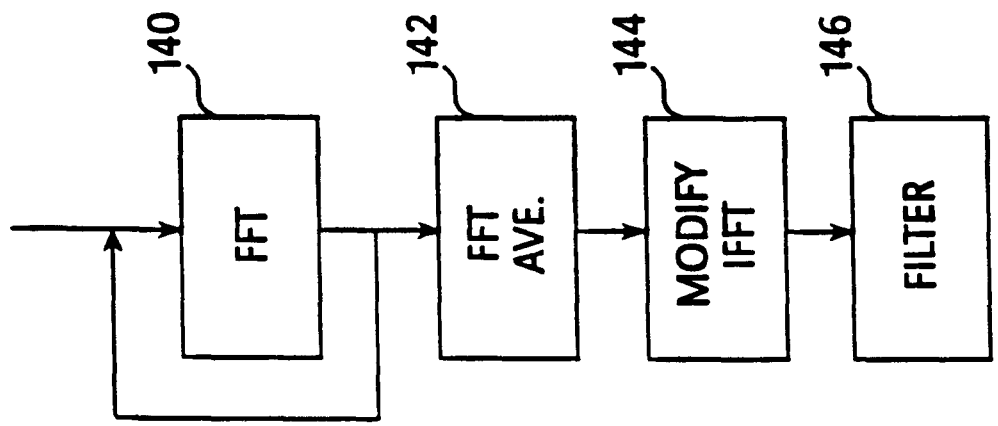
FIG. 7 is a flow chart showing a line characterization operation.

With reference to FIGS. 3 and 7, a line characterization operation 200 can be performed by control circuit 92 to characterize conditions on subscriber line 52. Control circuit 92 preferably provides a series of predefined characterization tasks such as task 150 (FIG. 6) at a step 202. The predefined characterization tasks can be any line characterization task which involves the analysis of conditions on line 52. Predefined characterization tasks such as task 150 (FIG. 6) are preferably active tests. Active tests cannot generally be performed when modem 54 is transmitting data (e.g., a non-idle).

After a series of predefined tasks have been selected, modems 54 and 56 can schedule when tasks are to be performed at a step 204. Tasks can be performed at a variety of times such as various times of day, or scheduled to be performed after particular events, such as, bringing telephone 80 off-hook, turning on modem 54, or other events. For example, a task can be scheduled to be performed every hour during which modem 54 is not transmitting data. Circuit 104 can include a monitoring circuit to determine when telephones 80 have been brought on-hook or off-hook.

At a step 206, modem 54 performs the tasks and measures predetermined parameters to obtain a result. For example, circuit 104 can measure the amplitude of the received test signal at a step 206. The amplitude can be analyzed to determine a result. The result is preferably stored at a step 204. The result can be stored in computer 84 (FIG. 1), in an EPROM (not shown), in modem 54, in memory, or other storage buffer. The result represents characteristics of subscriber line 52. After step 204, steps 202 and 204 can be repeated several times while adjusting various characteristics of subscriber line 52. For example, computer 84 (FIG. 1) can operate software which tells the user to unhook and hook telephones 80 at particular times. The hooking and unhooking of telephones 80 changes impedance associated with subscriber line 52. The characterization tasks can be performed during each of the conditions (e.g., when one, two or three telephones 80 are on-hook or off-hook). Additionally, steps 202–204 can be repeated at various times of day and various days of the week. Performance over time and under differing conditions allows statistical analysis and the results to be performed at a step 206.

The statistical analysis preferably allows the characteristics of subscriber line 52 to be defined with more certainty. For example, characteristics related to particular days of weeks and operating times can be characterized. For instance, subscriber line 52 may be busier during working hours and therefore have increased cross talk noise which must be compensated for by equalizer 98. Additionally, the statistical analysis can allow maximum and minimum operating characteristics associated with subscriber line 52 to be characterized. For instance, maximum and minimal impedances associated with subscriber line 52 can be determined by analysis of parameters over a period of time.

The results stored by modem 54 or computer 84 can be utilized when performing the rapid retrain operation as discussed with reference to FIG. 5. For example, modem 54 can recognize particular error patterns associated with error processor 96 (FIG. 4) and determine what the characteristics on subscriber line 52 are by referencing a data base of results generated at step 204. The results can include equalizer control signals stored with reference to various conditions on line 52. The various conditions can be one or several telephones 80 off-hook, particular times of day, differing levels of cross-talk on line 52, or other conditions. By recognizing these conditions and rapidly retrieving equalizer control signals from a database for these conditions, modem 54 can more accurately and more quickly receive and transmit data on line 52.

Additionally, modem 54 can monitor automatic gain control circuit 102 (FIG. 3) to determine if a large decibel (db) changes are occurring on line 52. Large db drops on line 52 can be associated with one of telephones 80 being brought off-hook. Line characterization circuit 104 can provide equalizer control signals associated for the condition when telephone 80 is off-hook in response to sensing such a large db drop.

Although modem 54 is discussed as including line characterization 104 and modem 54 receives the test signal, modems 54 and 56 can be configured so that modem 56 includes line characterization circuit 104 and receives the test signal. Modems 54 and 56 can also be configured so that the characterization tasks are performed at a lower instruction clock rate in comparison to a full clock rate so power consumption is reduced during characterization operations.

It is understood that, while the detailed drawings and specific examples given describe preferred exemplary embodiments of the present invention, they are for the purpose of illustration only. The apparatus and method of the invention is not limited to the precise details and conditions disclosed. For example, although QAM signals and frequency division multiplexing is utilized, other protocols can be implemented. Also, although parameters related to a rapid retrain operation are discussed, the rapid retrain operation may include a variety of steps for ensuring the integrity of the data channel at high data rates. Various changes may be made to the details disclosed without departing from the spirit of the invention which is defined by the following claims.

What is claimed is:

1. A method of characterizing a subscriber line in a communication system including a first modem and a second modem coupled via the subscriber line, the second modem including an equalizer defined by the equalizer control signals, the method comprising:

providing a test signal from the first modem to the second modem across the subscriber line under a plurality of conditions, wherein the conditions include placing at least one telephone coupled to the subscriber line off-hook or a particular time of day;

receiving the test signal with the second modem under the conditions;

analyzing the test signal received by the second modem to generate a characterization signal for each of the conditions, the characterization signal including the equalizer control signals configured for each of the conditions; and storing the characterization signal with respect to each of the conditions in a memory associated with the second modem.

2. The method of claim 1 further comprising:
providing instructions to a user to adjust the conditions of the subscriber line.

3. The method of claim 1 further comprising:
providing instructions to a user to adjust the conditions of the subscriber line, wherein the adjusting step includes placing at least one telephone coupled to the subscriber line off-hook.

4. The method of claim 1, wherein the test signal includes white noise.

5. The method of claim 1, wherein the test signal includes a plurality of tones at predetermined frequencies.

6. The method of claim 1, wherein the test signal is a chirp signal.

7. A method of characterizing a subscriber line in a communication system including a first modem and a second modem coupled via the subscriber line, the second modem including a digital filter defined by tap coefficients, the method comprising:

provide a test signal from the first modem to the second modem across the subscriber line under a plurality of conditions;

receiving the test signal with the second modem under the conditions:

analyzing the test signal received by the second modem to generate a characterization signal for each of the conditions;

storing the characterization signal with respect to each of the conditions in a memory associated with the second modem, the characterization signal being the tap coefficients; and repeating the providing, receiving, analyzing, and storing steps at particular times of the day.

8. The method of claim 7, wherein the characterization signal is stored with reference to the particular times of the day.

9. A digital subscriber line modem, comprising:

a memory;

a data line access coupled to a subscriber line;

an equalizer coupled to the data line access, the equalizer having a response in accordance with equalizer control signals;

a line characterization circuit coupled to the equalizer, the line characterization circuit receiving a test signal on the subscriber line when the subscriber line has a particular parameter, the particular parameter involving unhooking a telephone coupled to the subscriber line, a particular time of day, or both, and the line characterization circuit analyzing the test signal to generate the equalizer control signals and storing the equalizer control signals with respect to the particular parameter in the memory.

10. The digital subscriber line modem of claim 9, wherein the equalizer control signals are tap coefficients.

11. A method of characterizing a subscriber line in a communication system including a first modem and a second modem coupled to the subscriber line, the second modem including an equalizer defined by equalizer coefficients, the method comprising:

performing a characterization task on the subscriber line under a plurality of conditions, wherein the conditions include placing at least one telephone coupled to the subscriber line off-hook or storing a particular time of day;

measuring parameters associated with the characterization tasks to obtain a result for each of the conditions; and storing the result for each of the conditions in a memory associated with the second modem, the result being related to characteristics of the subscriber line and including the equalizer control signals.

12. The method of claim 11 further comprising:

scheduling the performance of a series of the characterization task over a time period.

13. The method of claim 11 further comprising:

rapidly retraining the second modem by recognizing a particular condition of the conditions and retrieving the equalizer control signal for the particular condition from memory.

14. The method of claim 13, wherein the particular condition is unhooking a telephone.

15. The method of claim 14, wherein the particular condition is recognized via a gain control circuit in the second modem.

16. The method of claim 14 wherein the particular condition is recognized via error signals from an error detection circuit in the second modem.

17. The method of claim 16, wherein the error signals include tangential error, radial error, or square errors.

18. The method of claim 16 wherein the error signals include trellis coding errors or Reed Solomon errors.

19. The method of claim 16, wherein the memory part of a computer is coupled to the second modem.

* * * * *